(12) United States Patent
Goraczko et al.

(10) Patent No.: US 8,732,487 B2
(45) Date of Patent: May 20, 2014

(54) PREDICTIVE COMPUTING DEVICE POWER MANAGEMENT

(75) Inventors: Michel Goraczko, Seattle, WA (US); Jie Liu, Medina, WA (US); Aman Kansal, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 255 days.

(21) Appl. No.: 12/826,692

(22) Filed: Jun. 30, 2010

(65) Prior Publication Data

US 2012/0005490 A1   Jan. 5, 2012

(51) Int. Cl.
*G06F 1/00* (2006.01)

(52) U.S. Cl.
USPC ........................................................ 713/300

(58) Field of Classification Search
USPC ......................................... 713/300, 320, 310
See application file for complete search history.

(56) References Cited

U.S. PATENT DOCUMENTS

| | | |
|---|---|---|
| 5,694,607 A | 12/1997 | Dunstan et al. |
| 6,609,208 B1 | 8/2003 | Farkas et al. |
| 7,007,256 B2 | 2/2006 | Sarkar et al. |
| 7,216,243 B2 | 5/2007 | Chou et al. |
| 7,726,144 B2 * | 6/2010 | Larson et al. ................. 62/259.2 |
| 2006/0156209 A1 | 7/2006 | Matsuura et al. |
| 2006/0271214 A1 | 11/2006 | Brown |
| 2007/0004468 A1 | 1/2007 | Boros |
| 2007/0219732 A1 | 9/2007 | Creus et al. |
| 2007/0245163 A1* | 10/2007 | Lu et al. ......................... 713/300 |
| 2008/0209243 A1 | 8/2008 | Ghiasi et al. |
| 2009/0006878 A1 | 1/2009 | Borghetti et al. |
| 2009/0044032 A1 | 2/2009 | Chainer |
| 2009/0049312 A1* | 2/2009 | Min ................................. 713/300 |
| 2009/0125293 A1 | 5/2009 | Lefurgy et al. |
| 2009/0249095 A1* | 10/2009 | Poornachandran et al. .. 713/320 |
| 2009/0319988 A1 | 12/2009 | Teranishi et al. |
| 2010/0063643 A1* | 3/2010 | Boss et al. ..................... 700/291 |
| 2010/0100716 A1* | 4/2010 | Scott et al. ........................ 713/1 |
| 2010/0262842 A1 | 10/2010 | Kansal et al. |
| 2010/0313270 A1 | 12/2010 | Kim et al. |
| 2011/0083025 A1* | 4/2011 | Lee ................................ 713/320 |

FOREIGN PATENT DOCUMENTS

WO   2009002171 A1   12/2008

OTHER PUBLICATIONS

Snowdon, et al., "Koala a Platform for OS-level Power Management", Retrieved at << http://ertos.nicta.com.au/publications/papers/Snowdon_LPH_09.pdf >>, European Conference on Computer Systems, Proceedings of the 4th ACM European conference on Computer systems, Apr. 1-3, 2009, pp. 14.

(Continued)

*Primary Examiner* — Mohammed Rehman
*Assistant Examiner* — Alyaa T Mazyad
(74) *Attorney, Agent, or Firm* — Steve Wight; Carole Boelitz; Micky Minhas

(57) ABSTRACT

The described implementations relate to predictive computing device energy management. One implementation measures resource usage of a computing device that employs a power policy. This implementation also estimates resource usage of the computing device having at least one different power policy without actually running the at least one different power policy on the computing device.

20 Claims, 6 Drawing Sheets

ENERGY USAGE PREDICTION SYSTEM 200

(56) References Cited

OTHER PUBLICATIONS

Harris, et al., "Exploiting User Behaviour for Context-aware Power Management", Retrieved at << http://www.tara.tcd.ie/bitstream/2262/32526/1/Exploiting%20user.pdf >>, In Proceedings of the International Conference on Wireless and Mobile Computing, Networking, and Communications, 2005, pp. 9.

Narayanan, Dushyanth., "Software Power Measurement", Retrieved at << http://research.microsoft.com/pubs/70166/tr-2005-51.pdf >>, Technical Report, MSR-TR-2005-51, Apr. 26, 2005, pp. 12.

Coburn, et al., "Power Emulation: a New Paradigm for Power Estimation", DAC 2005, Anaheim, California, Jun. 2005, pp. 700-705.

Dong, et al., "Sesame: Self-Constructive Energy Modeling for Battery-Powered Mobile Systems", Dec. 2010, pp. 1-14.

Kansal, et al., "Virtual Machine Power Metering and Provisioning", SoCC'10, Indianapolis, Indiana, Jun. 2010, 12 pages.

Mayo, et al., "Energy Consumption in Mobile Devices: Why Future Systems Need Requirements—Aware Energy Scale-Down", Power-Aware Computer Systems, 2003, 15 pages.

Rantala, et al., "Modeling Energy Efficiency in Wireless Internet Communication", MobiHeld '09, Barcelona, Spain, Aug. 17, 2009, pp. 67-68.

Rice, et al., "Decomposing Power Measurements for Mobile Devices", in Eighth Annual IEEE International Conference on Pervasive Computing and Communications (PerCom), Mar. 29-Apr. 2, 2010, 9 pages.

Thompson, et al., "Analyzing Mobile Application Software Power Consumption Via Model-Driven Engineering", in Proceedings PECCS, Feb. 2011, 13 pages.

Chedid, et al., "Power Analysis and Optimization Techniques for Energy Efficient Computer Systems", Retrieved at <<http://academic.csuohio.edu/yuc/papers/survey_10_18_final.pdf>>, Retrieved date: Feb. 17, 2009, pp. 1-46.

Choi, et al., "Fine-Grained-Dynamic Voltage and Frequency Scaling for Precise Energy and Performance Trade-Off Based on the Ratio of Off-Chip Access to On-Chip Computation Times", Retrieved at <<http://atrak.usc.edu/ ~massoud/Papers/PMU-DVFS-date04.pdf, Retrieved date: Feb. 17, 2009, Department of EE-Systems, USC, Los Angeles, CA., 6 pages.

"Enterprise Server and Data Center Energy Efficiency Initiatives", Retrieved at <<http://www.energystar.gov/index.cfm?c=prod_development.server_efficiency>>, Retrieved date: Feb. 17, 2009, 4 pages.

"Event Tracing for Windows (ETW)", Retrieved at <<http://msdn.microsoft.com/en-us/library/aa468736.aspx>>, Retrieved date: Feb. 17, 2009, 2009 Microsoft Corporation, 1 page.

Fonseca, et al., "Quanto: Tracking Energy in Networked Embedded Systems", Retrieved at <<http://www.usenix.org/events/osdi08/tech/full_papers/fonseca/fonseca.pdf>>, Retrieved date: Feb. 17, 2009, 8th USENIX Symposium on Operating Systems Design and Implementation, pp. 323-338.

Krishnan, et al., "Power Analysis of Disk I/O Methodologies", Retrieved at <<http://software.intel.com/en-us/articles/power-analysis-of-disk-io-methodologies/>>, Retrieved date: Feb. 17, 2009, Intel Software Network, 11 pages.

Lee, et al., "An Energy Characterization Framework for Software-Based Embedded Systems", Retrieved at <<https://qir.kyushu-u.ac.jp/dspace/bitstream/2324/6347/1/donghoon06_1_pdf>>, Retrieved date: Feb. 17, 2009, 6 pages.

Rivoire, et al., "A Comparison of High-Level Full-System Power Models", Retrieved at <<http://www.usenix.org/events/hotpower08/tech/full_papers/rivoire/rivoire_html>>, Retrieved date: Feb. 17, 2009, 11 pages.

Seo, et al., "A Generic Approach for Estimating the Energy Consumption of Component-Based Distributed Systems", Retrieved at <<http://sunset.use.edu/publications/TECHRPTS/2005/usccse2005-506/usccse2005-506.pdf>>, Retrieved date: Feb. 17, 2009, Department of Computer Science, USC, Los Angeles, CA., pp. 1-14.

Steigerwald, et al., "Creating Energy-Efficient Software", Retrieved at <<http://software.intel.com/media/js/ie_file.php?f=http://software.intel.com/file/1347>>, Retrieved date: Feb. 17, 2009, Intel Leap Ahead, 2007, Intel Corporation, 30 pages.

Flinn, Jason, "Managing Battery Lifetime with Energy-Aware Adaptation", ACM Transactions on Computer Systems, vol. 22, No. 2, May 2004, pp. 137-179.

Seo, et al., "An Energy Consumption Framework for Distributed Java-Based Systems", Proceedings of the 22nd IEEE/ACM International Conference on Automation Software Engineering, 2007.

Nowotarski, et al., "Nonintrusive Load Monitoring", Wikipedia, Feb. 12, 2009.

* cited by examiner

PREDICTIVE COMPUTING DEVICE POWER MANAGEMENT

BACKGROUND

The present application relates to energy consumption by computing devices. Understanding energy consumption facilitates energy conservation. Energy conservation can be interesting from a macro point of view, such as relative to conserving the world's resources. Energy conservation can also be interesting from a micro perspective, such as relative to reduce overheating of a processor or a bank of servers, or to avoid a battery of a mobile computing device going dead at an inconvenient time.

A computing device can have one or more power management elements, such as screen brightness. Each power management element can have multiple power management settings. For instance, screen brightness might have one power management setting that sets the computing device's display at full brightness while another power management setting sets the screen at a lower brightness to conserve energy. Existing energy consumption techniques are backwards looking, in that they measure past usage under the current power management setting(s) on the computing device. The techniques can then extrapolate the past energy consumption for that power management setting going forward on the computing device. However, such techniques do not offer any predictive value for other power management setting(s) which have not actually been employed on the computing device.

SUMMARY

The described implementations relate to predictive computing device energy management. One implementation measures resource usage of a computing device that employs a power policy. This implementation also estimates resource usage of the computing device having at least one different power policy without actually running the at least one different power policy on the computing device.

The above listed example(s) are intended to provide a quick reference to aid the reader and are not intended to define the scope of the concepts described herein.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the Figure and associated discussion where the reference number is first introduced.

DETAILED DESCRIPTION

Overview

The described implementations relate to predictive power or energy management of computing devices. Briefly, the patent describes predictive power management tools (PPM tool(s)). The PPM tools can be thought of as components, systems or methods that can automatically recommend power management settings or power settings for a computing device. The PPM tools can also predict an impact on energy use of changing power settings of the computing device.

Stated another way, measuring energy consumption under a current power management setting can be accomplished utilizing several techniques. For example, external energy meters (e.g. Kill-A-Watt™ or Watts Up?™) or on-board power sensors can provide this information. However, these techniques have no ability to estimate energy consumption for an un-utilized power management policy. The present concepts can solve this deficiency (i.e., the present concepts can estimate energy consumption associated with a power management policy without having to actually implement and run the power management policy).

Figure 1:
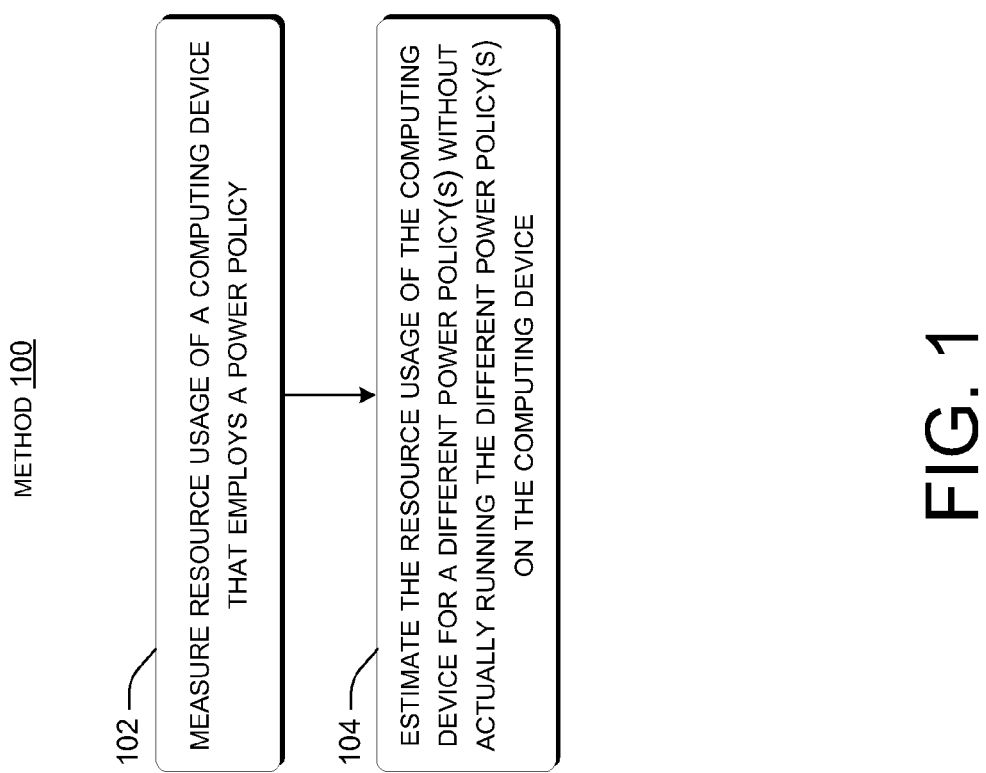
FIG. 1 shows an example of a method for implementing predictive computing device energy management concepts in accordance with some implementations of the present concepts.

FIG. 1 offers an introductory explanation of some of the present concepts in the form of a PPM tool method example 100. In this case, the PPM tool can measure resource usage of a computing device that employs a power policy at 102. The computing device can have multiple elements or factors that affect energy or power usage. Examples of such elements can include screen brightness, screen refresh rate, processor frequency, and/or memory access rate, among others. Individual elements can have multiple power management settings. For instance, screen brightness might be adjustable to a brightest setting, a range of medium settings, or a lowest brightness setting. A power policy can relate to power management settings of some or all of the elements. Accordingly, different power policies have different individual power management settings.

The PPM tools can estimate resource usage (such as energy usage) of the computing device for a different power policy (ies) without actually running the different power policy(ies) on the computing device at 104. In one case, performance and resource usage logs for the measured power policy can be obtained. Energy usage associated with the measured power policy can provide an estimate of the work being performed by the computer system. Multiple different power policies can then be evaluated by comparing power usage differences between the measured power policy and each of the individual different power policies. To this end, energy usage changes caused by the power setting differences can be estimated by the proposed PPM tools. Energy usage of the individual different power policy, for the given (i.e., previously measured) resource or expected work performed, can be predicted from the energy usage of the measured power policy and the energy use changes associated with the differences between the measured power policy and the individual different power policy.

In some cases, a different power policy can be recommended for the computing device. Various parameters can be utilized to select the individual different power policy to recommend. For instance, in one case the method can use previously learned power models from the computing device and/or other computing devices, explicit measurements of energy use from the computing device and/or other computing devices, user past history, user preferences, community knowledge, information from other computing devices associated with the user, or a combination of the above to recommend the individual power policy to the user. To summarize, the previously learned power policy(s) may be associated with the user or with third parties, such as peers of the user.

Figure 2:
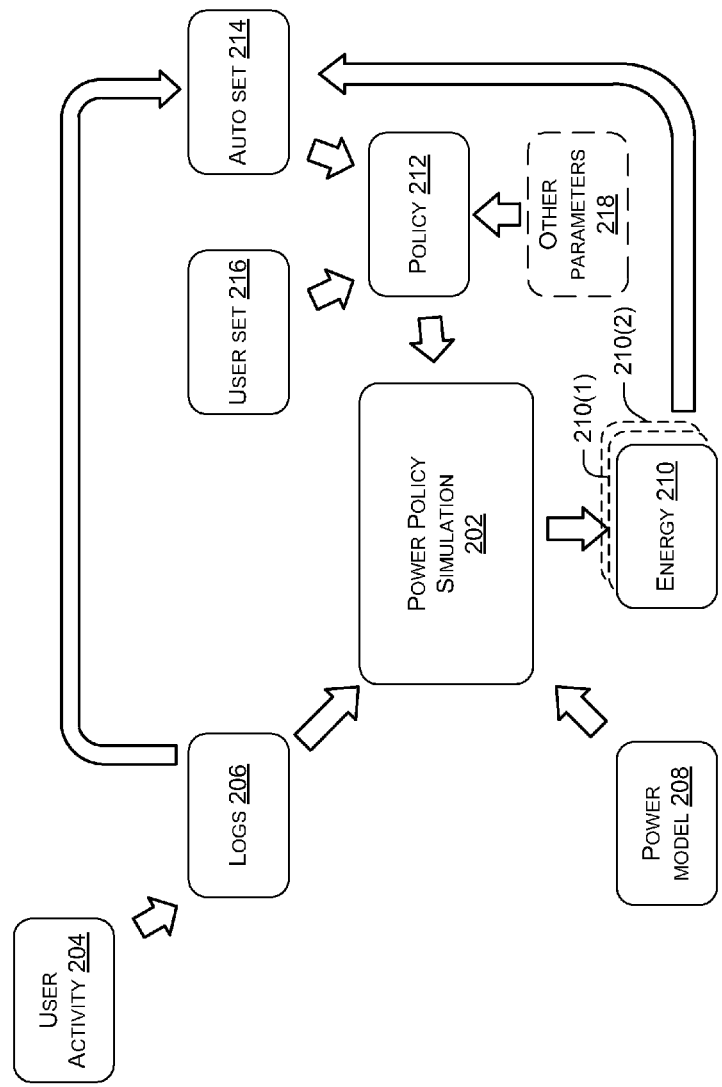
FIG. 2 illustrates an example of a system for accomplishing predictive computing device energy management in accordance with some implementations of the present concepts.

FIG. 2 offers an energy usage prediction system 200 that can implement some of the present predictive power management concepts. Namely, energy usage prediction system 200 includes power policy simulation 202. Note, that the function of the energy usage prediction system should be more apparent once all of the individual elements are introduced.

Energy usage prediction system 200 can track user activity 204, represented and stored as one or more logs 206. The logs can be thought of as traces of resource utilization (such as processor active time, disk activity, screen usage) over time for the computing device with the power policy in use at that time. A power model 208 can also be obtained for the computing device. The power model indicates the amount of the energy use associated with individual features of the computing device (and the power settings related to the features for the current power policy).

Various techniques/mechanisms are known for obtaining power models. In some examples, existing power modeling methods can build a power model that relates performance counters (another form of representing resource usage logs) from CPU, memory, disk, and network, to power consumption. One such technique/mechanism is described in U.S. patent application Ser. No. 12/420,372. In summary, in some cases the procedure to build a power model can involve the following. A number of power measurements are obtained using an external or internal power meter with the various components of the computer (CPU, disk, monitor, etc.) being in different power states. For instance, one power measurement may be obtained when the CPU is at frequency level 3 GHz, CPU utilization is 30%, disk activity is 10 Mbps, and screen brightness is 90%. The power states of the components may be represented numerically using performance counters. An equation is written that represents the power as a function of the performance counters, such as:

$$Power=f(CPU\ power\ states, disk\ power\ states, monitor\ power\ states, other\ power\ settings).$$

Since multiple power settings are obtained for multiple different power states, numerous instances of the above equation are obtained and a machine learning method (existing methods or new ones) is used to infer the function f( ). For instance, the machine learning method used may be linear regression. In this case the form of f( ) is a linear function such as:

$$Power=a_1*(CPU\ utilization)+a_2*(disk\ utilization)+\ (similar\ terms\ for\ other\ components).$$

Using multiple readings of the power values and performance counters representing the component power states (CPU utilization, disk utilization, etc.) the technique can obtain more equations than the number of unknowns ($a_1$, $a_2$, etc). Linear regression is a known technique that can help solve for the unknowns from such data. The function f( ), in this case represented using the coefficients $a_1, a_2, \ldots$, denotes the power model. This power model can be used to estimate power using resource usage performance counters.

Based upon this initial input of logs 206 and power model 208, the power policy simulation 202 generates an initial energy usage estimate 210. Energy usage prediction system 200 can select or formulate a different power policy 212 to change energy usage 210. For instance, the energy usage prediction system 200 might try to formulate a different power policy that uses less energy while still satisfying the user. Energy usage prediction system 200 can formulate the different power policy 212 based upon various inputs. First, the energy usage prediction system 200 can consider various power settings. For instance, the energy usage prediction model can consider energy usage (estimate) 210 and/or user logs 206 to auto select or auto set power settings 214. For instance, if the user logs indicate that the user prefers a given screen brightness power setting, then that given screen brightness may be auto set at 214.

The energy usage prediction system 200 may also consider user set power settings 216. For instance, if the energy usage prediction system 200 selects a new power policy with a low brightness screen power setting, then the user may manually change the value to a brighter power setting at 214. These manual settings 214 can be thought of as user preferences. The energy usage prediction system 200 can try to adjust other power settings in a power policy so that the user preferences can be maintained in the formulation of another power policy 212.

Further, other parameters 218 can be considered by the energy usage prediction system 200. For instance, other parameters can relate to power settings and/or power policies that are not directly related to the user and/or the computing device yet can be utilized in formulating the power policy. For instance, the power policy(s) employed by other users that are similar to the user of the computing device can be considered as other parameters 218. For instance, the user may be a graphics designer and other graphics designers may use power policies that have high screen brightness power settings and high screen resolution settings, but relatively low processor speed settings. The power policy of these other similarly situated third party users can be considered in selecting power policy 212.

The energy policy 212 can be run through the power policy simulation 202 to produce an updated energy usage estimate 210(1). An example of such a method is provided below relative to FIG. 6. At this point, the updated energy usage is an estimated or predicted energy usage. Accordingly, this updated energy usage estimation can be generated without the associated power settings actually being implemented on the computing device. This process can be repeated in an iterative manner to refine energy policy 212 and/or to compare energy usage associated with competing power policies before selecting one for implementation.

To summarize, once energy usage prediction system 200 is initially configured, energy usage can be predicted for (previously measured or expected) user traces to simulate the effect of new power management policies. The energy usage prediction system can predict the impact on energy usage based on a single change or a group of changes in power settings. In contrast, with other technologies, when changing a power setting, such as screen brightness, the user needs to wait some time before seeing the impact that this change will make on battery life or cost. With energy usage prediction system 200 the energy impact is known before applying the change(s). Since the impact can be computed very quickly (in a time duration that may be imperceptible to human users), the user can instantly see the expected battery life with various possible settings, without actually first applying each setting and then waiting for its effect on battery life to show up. Energy usage prediction system 200 can also cover multiple setting changes at once, like changes of full power profile that include settings such as processor power states, sleep times, wireless policies, and more.

Figure 3:
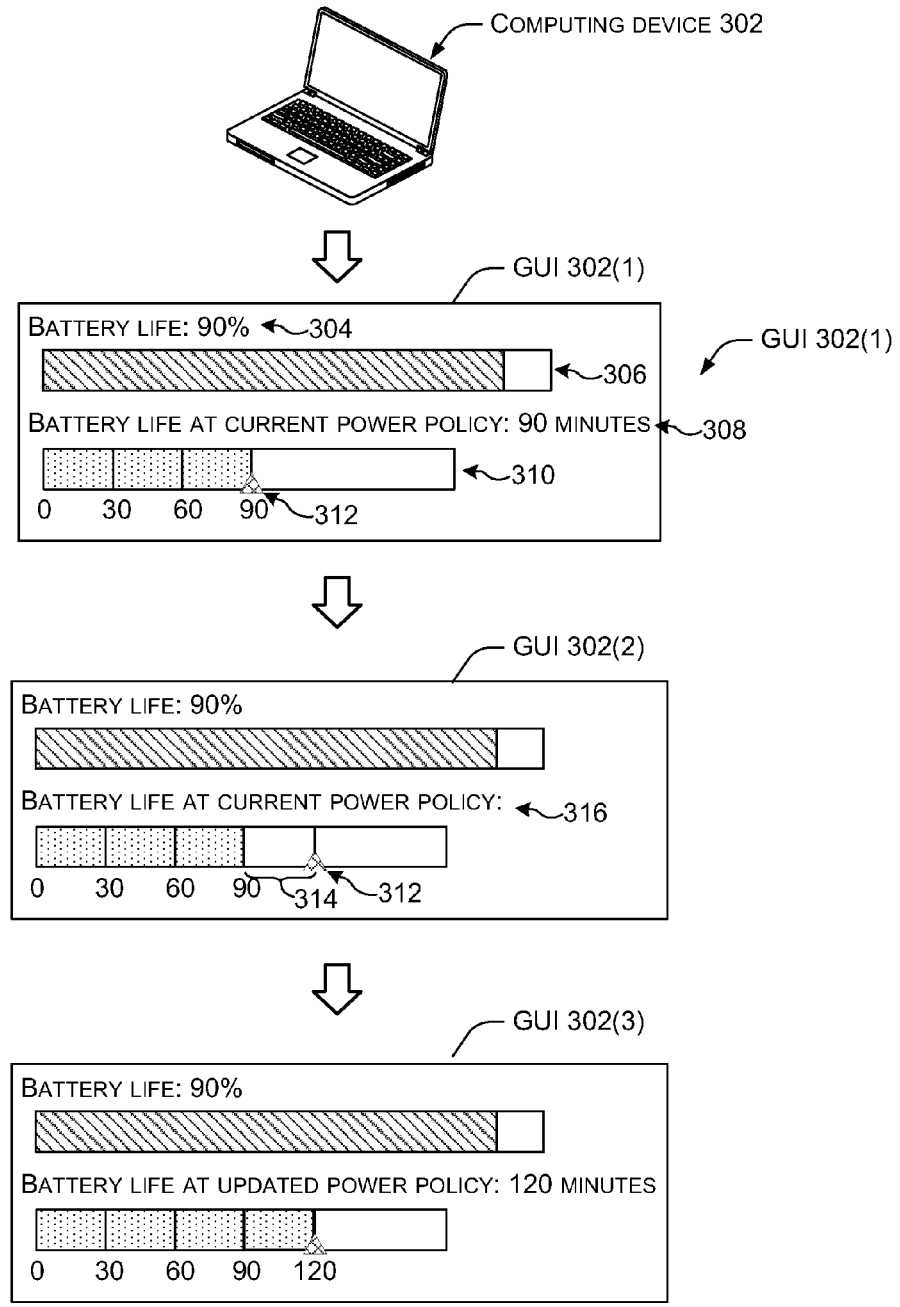
FIG. 3 illustrates a scenario in which predictive computing device energy management can be accomplished in accordance with some implementations of the present concepts.

To further explain the capabilities of energy usage prediction system 200, consider FIGS. 2-3 collectively. FIG. 3 involves a scenario 300 where a user of computing device 302 takes the computing device on a long airline flight. After takeoff, the user realizes that the airplane does not have a power outlet for the computing device's charger, and thus the use of the computing device is limited to the energy stored in the computing device's battery. Assume that the user wants to watch a movie on the computing device during the flight and that the movie is 120 minutes long. The user accesses a control panel graphical user interface (GUI) 302(1) related to the battery.

The GUI 302(1) indicates textually that the battery is at 90% remaining charge as indicated at 304. The same information is graphically represented at 306. Further, the GUI indicates textually at 308 that under the current power policy the battery will provide 90 minutes of run time. This information is also shown graphically at 310. Graphical representation 310 also includes an icon 312 in the form of a 'carat' that indicates a desired run time. In GUI 302(1) icon 312 equals the indicated run time of 90 minutes. Recall that the user wants to watch a 120 minute movie and does not want to miss the climax that appears in the last 30 minutes of the movie, so the present configuration is undesirable to the user.

As shown in subsequent GUI 302(2), as indicated at 314 the user slides a desired run time icon 312 to 120 minutes (or otherwise indicates a desired run time). At this point (which may only last a few microseconds and/or be imperceptible to the user) the energy usage prediction system 200 can be evaluating and comparing power policies to satisfy the user input. Accordingly, energy usage prediction system 200 can use the desired run time of 120 minutes as a desired setting and compute estimated energy usage 210(2) for different power policies to determine the ones that yield an expected battery lifetime of 120 minutes or more. As an example, the energy usage prediction system 200 can select one of the different power policies that will satisfy the desired run time, as well as potentially satisfying past user preferences with regards to screen brightness, but set the processor speed to a lower setting that yields just enough computational capacity to play the movie.

GUI 302(3) shows that energy usage prediction system 200 has selected a new power policy that satisfies the user input and thus the expected battery life matches the user input at 120 minutes. The scenario could end at this point, but assume that the user usually works in low light conditions in an office or at home, but now the airplane is flying above the clouds during the daytime. The energy usage prediction system 200 could select a power policy that gains much of the needed battery life (90 minutes to 120 minutes) by dimming the screen brightness. The user logs 206 indicate that such a strategy is acceptable to the user. However, in this instance, the user cannot see the movie due to the bright conditions so the user manually resets the screen brightness to a brighter setting (i.e., user set (or re-set) 216). As a result, the battery life may fall below the desired 120 minutes. The energy usage prediction system 200 can now revisit power policies 212 to determine if a power policy can be identified that satisfies both the 120 minute desired run time and the manually set screen brightness. For instance, the energy usage prediction system 200 may identify a power policy that lowers screen resolution and refresh rate, but maintains the run time and brightness. Thus, rather than being a one-time solution, the energy usage prediction system 200 can be iterative and continually improving to conserve resources and/or contribute to a positive user experience.

In another scenario, other parameters 218 can be utilized to customize the power policy to the user with a power policy that offers energy savings, but still produces a satisfying user experience. For instance, the user's calendar can be utilized under other parameters 218. For instance, if the user has a weekly lunch meeting where the computing device is not utilized, then the power policy can power down the computing device at the start time of the lunch meeting rather than waiting a customary predefined time with no user activity to power down. Conversely, if the user has another weekly meeting where the computing device is always used, then the power policy can automatically power up for that meeting thereby decreasing lag time experienced by the user. Further still, the iterative feedback loop offered by energy usage prediction system 200 can allow the system to learn the reaction of a user to a power event and reduce or eliminate inconvenience (for example in case of a user always late to meetings).

Additional Examples

Figure 4:
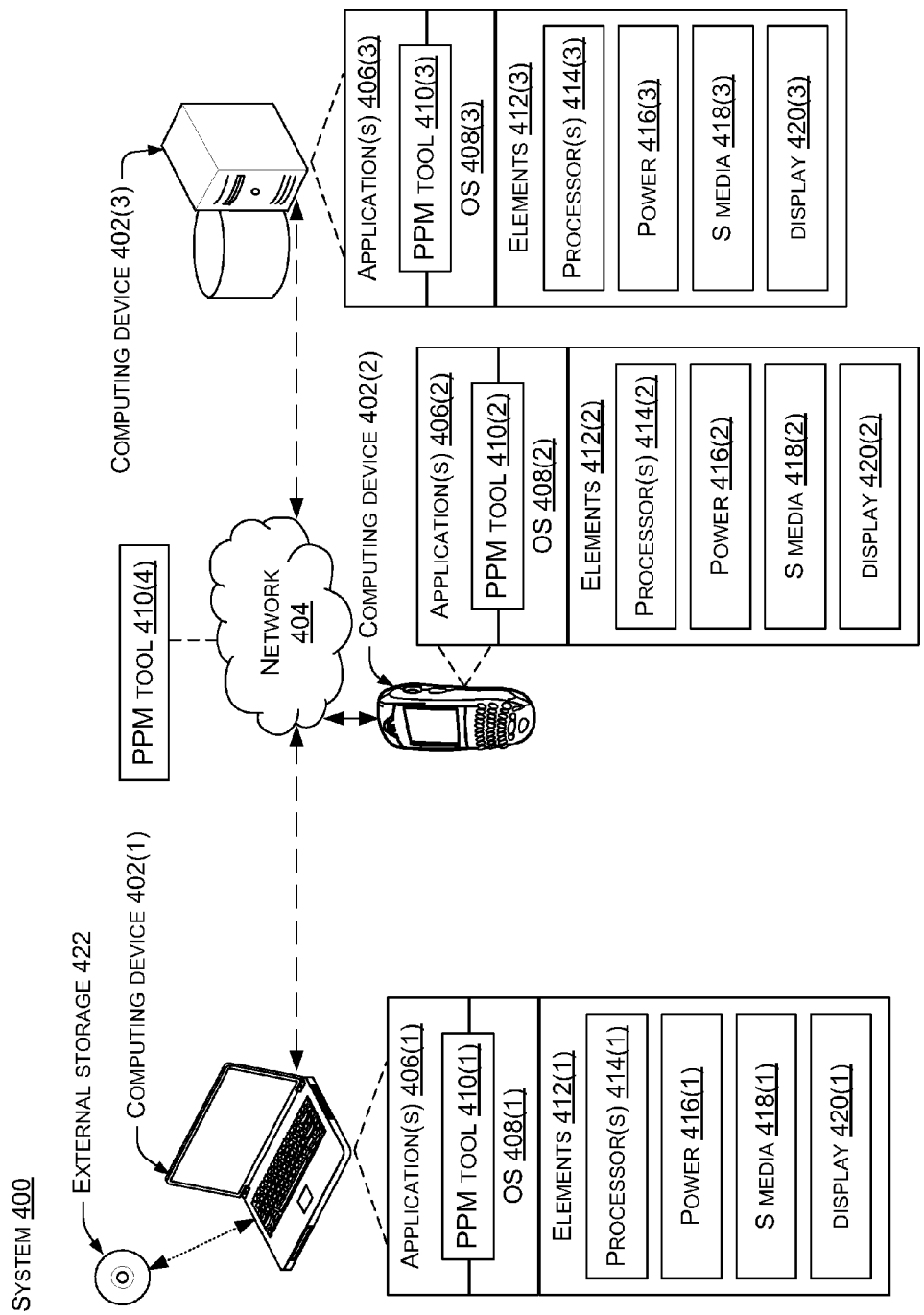
FIG. 4 illustrates a system that can be configured to perform predictive computing device energy management in accordance with some implementations of the present concepts.

FIG. 4 shows a system 400 that is configured to predict energy usage. In this case, system 400 includes three computing devices 402(1), 402(2), and 402(3). In this example, computing device 402(1) is manifest as a notebook computer, computing device 402(2) is manifest as a personal digital assistant (PDA), and computing device 402(3) is manifest as a desktop computer. The computing devices can exchange data over a network(s) 404. Individual computing devices can function in a stand-alone or cooperative manner relative to predicting energy usage.

In this case, each of computing devices 402(1)-402(3) can include several components that are introduced with suffixes that match the respective computing devices. The components can include application(s) 406, an operating system 408, a PPM tool 410, and computing elements 412. Illustrated examples of elements 412 can include processor(s) 414, power 416, storage media 418, and display 420. Individual elements can be associated with one or more power settings. For instance, display 420 may be associated with a power setting for brightness, a power setting for resolution, and a power setting for refresh rate, among others.

Processor 414 can execute data in the form of computer-readable instructions to provide a functionality. Data, such as computer-readable instructions, can be stored on storage media 418. The storage media 418 can include any one or more of volatile or non-volatile memory, hard drives, and/or optical storage devices (e.g., CDs, DVDs etc.), among others. The computing devices 402 can also be configured to receive and/or generate data in the form of computer-readable instructions from storage media 422 that for sake of explanation can be thought of as external storage media. Examples of external storage media can include optical storage devices (e.g., CDs, DVDs etc.), hard drives, and flash storage devices (e.g., memory sticks or memory cards), among others. The computing devices may also receive data in the form of computer-readable instructions over network 404 that is then stored on the computing device for execution by its processor.

The PPM tool 410 can be configured to automatically recommend power management settings or power settings for a computing device. The PPM tool can also predict an impact of changing power settings of the computing device on energy use.

PPM tool 410 can be an application 406 and/or can run as part of the operating system 408. The PPM tool can estimate energy usage of power policy(s) without actually running the power policy(s) on the computing device.

In some implementations a computing device and its PPM tool can operate in a self-contained manner. In other instances, data can be shared among computing devices. For instance, assume that a single user owns computing devices 402(1)-402(3). A single user profile created on one of the computing devices can be useful in predicting user behavior and preferences on another computing device. For instance, a user profile on a notebook computer (i.e., computing device 402(1)) can be useful as a user profile (or a basis for a user profile) on the user's PDA (i.e., computing device 402(2)). Having power models, which include multiple categories of devices, can help save more energy and enhance the user experience. Linking these computing devices together can enhance user experience as well. For example, mobile phone (i.e., PDA) positioning capability can be used to wake up other computing devices earlier (i.e., as the user approaches with the mobile phone), giving the perception of an "always on" experience without the energy usage cost. Managing multiple devices (office pc, phone, home computers or even smart homes) with a single profile can provide increased savings and comfort. In another example, if the user takes his/her PDA (i.e., computing device 402(2)) and heads to the office, computing devices 402(1) and 402(3) that are still at the user's house (e.g., distant from the user) can aggressively manage their power settings until the user returns.

Alternatively or additionally, some implementations can utilize a community based model. In such a scenario, energy usage prediction systems can share data. The shared energy usage prediction may be used on other devices as is. More commonly, the shared energy usage prediction model can be used as a base-line or as one of the multiple inputs that can be considered when the PPM tool formulates an energy usage prediction model for an individual computing device. For instance, a learning curve for a user behavior can be greatly reduced if some user pattern can be matched to other users whose user profiles and/or energy usage prediction models have already been built. This can be done on a small scale for a group of co-workers or family members or at a larger scale of people in the same profession. These implementations can open the possibility to an increase in energy savings, both for single user devices and shared resources at work as well as at home. In some implementations, the community or workplace can provide more infrastructures, like card readers that when linked to a user can trigger wake events for devices in proximity.

Sharing information can also provide benefits for others. If a user has a power model for a specific device and decides to share the power model, then any user using the same device or in some cases a similar device can benefit. In this case the system can verify the specification of the device and upload the specification. The system can search for an exact match or lacking an exact match, try to match parts of the specification with parts on other devices.

The same can be done for user behavior patterns. When shared, the system can try to find a match with similar users and propose power policies used by these users, improving the experience of the new user quickly and reducing errors.

In some implementations, the PPM tool 410 can provide diagnostic information that can help with detection of failure or bad behavior on a computing device. The diagnostic feature can be achieved by creating check points or/and collecting energy usage and user behavior data. For example the PPM tool can detect a newly installed application that contributes considerably to idle power usage. The PPM tool can also detect a change in the energy needed to perform a write operation. Such a change can imply a component failure or imminent failure.

As mentioned above, any of computing devices 402(1), 402(2), or 402(3) can function in a stand-alone configuration. Accordingly, each of the computing devices is shown with a complete complement of components. Other implementations may be more distributed in nature. For instance, in one configuration, computing device 402(2) may not have a resident PPM tool, but instead can utilize cloud based PPM tool 410(4), or a PPM tool from one of the other computing devices.

The term "computing device" as used herein can mean any type of device that has some amount of processing capability. Examples of computing devices can include traditional computing devices, such as personal computers, cell phones, smart phones, personal digital assistants, or any of a myriad of ever-evolving or yet to be developed types of computing devices. Further, a system can be manifest on a single computing device or distributed over multiple computing devices.

Figure 5:
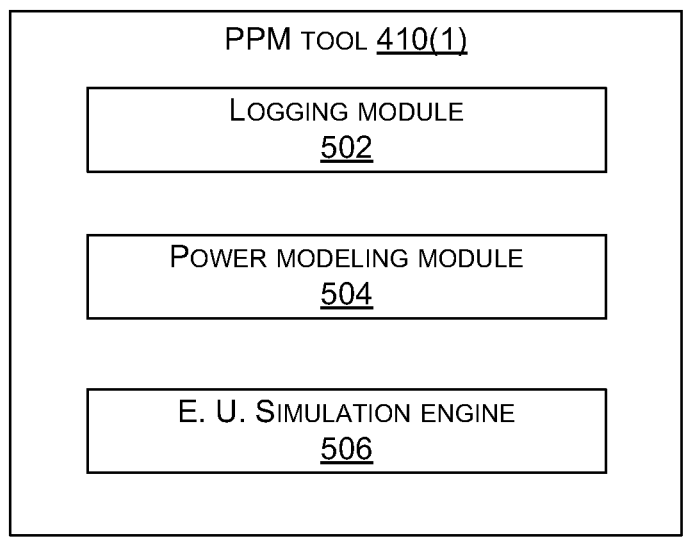
FIG. 5 illustrates some of the components of FIG. 4 in more detail in accordance with some implementations of the present concepts.

FIG. 5 shows PPM tool 410(1) from FIG. 4 in more detail. In this case, the PPM tool includes a logging module 502, a power modeling module 504, and an energy usage simulation engine 506.

The logging module 502 can record activity on a computing device. The activity can be user activity, such as a power setting that the user manually sets, times of day of usage, and/or what elements on the computing device led to energy usage and the amount and duration of that usage. The logs may also be referred to as performance traces.

Recording all activity from a computing device can be resource intensive. Some implementations can filter and/or compress the activities so that useful data is maintained without undue resource consumption.

The power modeling module 504 can be configured to generate a power model for the computing device from performance counters associated with the computing device.

The energy usage simulation engine 506 can be configured to estimate the potential energy usage under a new power policy by running a simulation based on the user's (or users') past performance log obtained from logging module 502 under the old power policy and the differences between the old and new policy settings. The energy usage simulation engine can leverage the power model generated utilizing a power modeling technique, such as those described above. That is, taking a set of performance counter traces (e.g. processor, disk, screen brightness, and idle timeout) obtained under the old policy, the energy usage simulation engine 506 can compute the values of the counter (and thus computing device energy consumption) under the new policy by simulating the power behavior of the computing device.

The simulation of energy consumption under different policies can depend on the component of interest. For example, the screen brightness affects battery life. When changing the brightness setting, the energy usage simulation engine can look up the power usage of the new brightness level and apply it to the energy drain of the computing device to produce a new estimate of power consumption or battery life remaining.

In another example, a more complex scenario can use a performance state of a processor to balance performance and energy saving. For instance, the energy usage simulation engine 506 can simulate the energy usage for 60 seconds. Now if the power state usage is restricted to a second power state then the energy usage simulation engine distributes the time the processor spends in the initial power state across the other power states (e.g., the second power state).

In another example, the energy usage simulation engine 506 can use a queuing theory model for the CPU and workload. For example, the workload can be modeled as an arrival process feeding requests into a queue and the CPU serves requests from the queue at a particular rate. When the power state is set from one value to another, the CPU serving rate changes, and the same set of events will stay longer (or shorter) in the queue, which affects when the computing device will be idle and can go to sleep.

Utilizing the above examples, the energy usage simulation engine 506 can predict the energy impact over different components of the system. By applying the same principal to other parameters of a power profile the energy usage simulation engine can estimate impacts on energy usage of changes in settings inside a power profile or even between entire profiles. The relevance of this estimate can be augmented by incorporating the usage pattern of a specific user. Furthermore, when all parameters are considered, different combinations of settings result in similar energy usage. For example lowering the screen brightness to level 2 may have the same impact as restricting performance state or disabling a particular feature on the system. When a goal in energy usage is presented and more than one choice of configuration is possible, the energy usage simulation engine 506 can present the user with a choice or selection on user preference (e.g. screen brightness versus performance).

Recall that one goal of the energy usage simulation engine 506 is to provide an estimate of the battery life and power consumption of the computing device after one or more power settings are changed. This estimate or computation can be used to show the user how the various power settings affect battery life when the setting is changed and without waiting for the effect to be observed over time. In contrast, other technologies estimate the new battery life after changing the settings by observing the new battery drain rate for a few minutes after changing the settings. The presently generated estimate can also be used to suggest suitable settings for desired target battery lifetimes.

In some implementations, energy usage simulation engine 506 can use the simulation method described below relative to FIG. 6 to determine the power consumption (and the battery life) when a power setting is changed.

Figure 6:
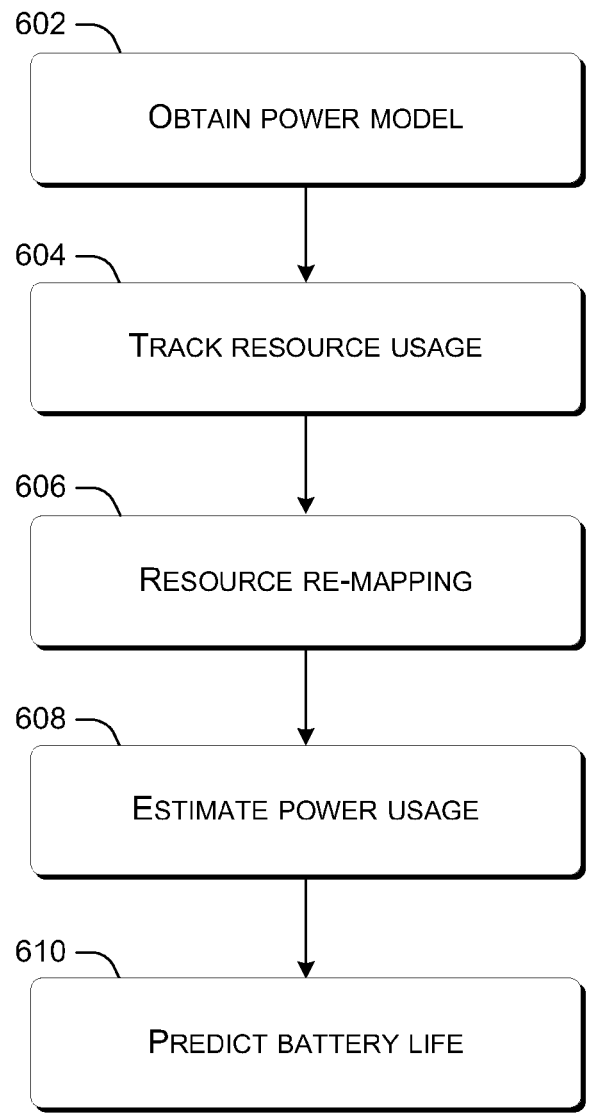
FIG. 6 shows a flowchart associated with predictive computing device energy management in accordance with some implementations of the present concepts.

FIG. 6 shows a flowchart of a simulation method 600 that can estimate power consumption relative to a power policy. The simulation method can be employed by energy usage simulation engine 506 and/or other components to accomplish predictive computing device energy management. In this case, the method is described in the context of a portable computing device that relies upon battery power. The method can also be used for other computing devices that do not rely upon battery power.

The simulation method can obtain a power model of a computing device at block 602. In some cases, the power model can be obtained during an initialization phase associated with the computing device. The power model relates the power settings and the usage of various computer components (disk, CPU, screen etc) to power consumption. The power model may be obtained via various techniques/methods.

The simulation method tracks resource usage at block 604. The tracking can provide a record or log of the resource usage (CPU utilization, screen brightness, disk usage, etc.) of the computing device as the computing device is used. The resource usage data can be maintained over a specified time period, say the past few minutes or days.

The simulation method re-maps resources at block 606. Whenever new power settings are to be used (either when input by the user, or when a range of settings is being explored by an automated method for discovering beneficial settings), the power usage at the new settings can be computed. For this purpose, the resource usage tracked in at block 604 above can first be changed to the resource usage at the new setting.

This computation can be trivial for some components For instance, if a screen was on during the time period tracked at block 604 and was at brightness setting 1, then when the setting is changed to brightness setting 2, the screen is still assumed to be on, but simply at the new brightness setting. For other settings, such as processor frequency, this re-mapping may involve more complex computation. For instance, if a task takes 10 seconds to run at processor frequency 3000 mega Hertz (MHz), then it may take 20 seconds to run at processor frequency 1500 MHz. Such computation examples are discussed above relative to energy usage simulation engine 506. The output of block 606 can be thought of as the resource usage trace at the new power setting.

The simulation method estimates power usage at block 608. In some implementations, the resource usage trace obtained from block 606 can be fed into the power model. The power model can compute the power consumption based on resource usage and power settings.

The simulation method predicts battery life at block 610. The prediction can be based upon the power consumption and the remaining battery capacity. Most computing devices provide a direct method to read the remaining battery capacity. Dividing this by the power consumption can give the time for which the battery will last.

The order in which described methods/techniques are introduced is not intended to be construed as a limitation, and any number of the described blocks can be combined in any order to implement the method, or an alternate method. Furthermore, the method can be implemented in any suitable hardware, software, firmware, or combination thereof, such that a computing device can implement the method. In one case, the method is stored on a computer-readable storage media as a set of instructions such that execution by a computing device causes the computing device to perform the method.

Conclusion

Although techniques, methods, devices, systems, tools, etc., pertaining to predictive computing device power management are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method, comprising: measuring resource usage associated with user activity on a computing device that employs an existing power policy that has first power management settings, wherein the measuring comprises determining a function of performance counters from a performance log of the user activity;

obtaining a power model for the computing device that reflects the measured resource usage associated with the user activity and the existing power policy; and, utilizing the power model to estimate the resource usage of the computing device having at least one different power policy that has second power management settings, wherein the estimating is accomplished without running the at least one different power policy on the computing device by computing differences in individual performance counters associated with the user activity between the second power management settings of the at least one different power policy and the first power management settings of the existing power policy to simulate running the at least one different power policy, wherein the measuring and the utilizing are performed by a processor.

2. The method of claim 1, wherein the measuring comprises identifying elements that contribute to the resource usage by the computing device and identifying individual power management settings of individual elements, and wherein the existing power policy comprises the identified individual power management settings.

3. The method of claim 2, wherein power is estimated for multiple different power policies including the at least one different power policy, and further comprising recommending an individual different power policy based at least in part on: user history, a user defined parameter, or third party power policy information.

4. The method of claim 1, wherein the measuring and the estimating are performed relative to the computing device and further comprising sharing the at least one different power policy with other computing devices.

5. The method of claim 1, wherein the at least one different power policy includes power settings obtained from other similar computer devices, another computing device associated with a same user as the computing device, or further computing devices associated with users that are similarly situated to the user of the computing device.

6. A system, comprising:
a logging module configured to record a log of user activity and energy use associated with that user activity on a computing device employing a power policy of power management settings;
a power modeling module configured to generate a power model for the computing device based upon the user activity and the associated energy use;
a predictive power management tool configured to automatically recommend new power management settings of a new power policy for the computing device based on the log; and,
wherein the predictive power management tool is further configured to predict an impact on energy use relating to changing to the new power management settings for the computing device utilizing the log, the power model and differences between the power management settings and the new power management settings; and
a processor configured to execute at least one of the logging module, the power modeling module, or the predictive power management tool.

7. The system of claim 6, wherein the predictive power management tool is configured to obtain power management setting information from other computing devices that are similar to the computing device.

8. The system of claim 6, wherein the predictive power management tool is configured to predict the impact without running the new power management settings on the computing device.

9. The system of claim 6, wherein the predictive power management tool comprises an energy simulation engine configured to predict the impact by estimating potential energy usage under the new power policy by running a simulation based on the log, the power model and differences between the power management settings and the new power management settings.

10. The system of claim 6, wherein the system comprises the computing device or wherein the system comprises the computing device and at least one other computing device and wherein the computing device and the at least one other computing device are associated with a single user.

11. A method, comprising: obtaining a power model of a computer device, the power model reflecting energy use associated with individual features of the computing device according to present power settings;
tracking resource usage during user activity of the computing device;
remapping resources related to changing to different power settings of the computing device; and,
estimating power consumption associated with the changed power settings without running the computing device with the changed power settings by utilizing the power model and a difference between the tracked resource usage associated with the individual features at the present power settings compared to the individual features at the changed power settings for the user activity, wherein at least the estimating is performed by a processor.

12. The method of claim 11, wherein the obtaining the power model comprises generating the power model with a software-based mapping from the resource usage to the power consumption.

13. The method of claim 11, wherein the tracking comprises generating a log of the resource usage and further comprising filtering the log and recording only a sub-set of the log.

14. The method of claim 11, wherein the tracking comprises generating a log of the resource usage and further comprising compressing the log and recording the compressed log.

15. The method of claim 11, wherein the present power settings are changed to satisfy a user defined parameter.

16. The method of claim 15, wherein the user defined parameter relates to a desired run time of the computing device.

17. The method of claim 11, wherein responsive to the tracking, further comprising utilizing an increase in the power consumption as an indication to check for a failing component.

18. The system of claim 6, wherein the system is included on the computing device.

19. The system of claim 6, wherein the system does not include the computing device.

20. The method of claim 1, wherein the obtaining comprises generating.

* * * * *